(12) United States Patent
Bocko et al.

(10) Patent No.: US 7,805,311 B1
(45) Date of Patent: Sep. 28, 2010

(54) EMBEDDING AND EMPLOYING METADATA IN DIGITAL MUSIC USING FORMAT SPECIFIC METHODS

(75) Inventors: Mark F. Bocko, Caledonia, NY (US); David Headlam, Rochester, NY (US); Zeljko Ignjatovic, Rochester, NY (US)

(73) Assignee: University of Rochester, Rochester, NY (US)

( * ) Notice: Subject to any disclaimer, the term of this patent is extended or adjusted under 35 U.S.C. 154(b) by 648 days.

(21) Appl. No.: 11/812,994

(22) Filed: Jun. 22, 2007

Related U.S. Application Data

(60) Provisional application No. 60/815,598, filed on Jun. 22, 2006.

(51) Int. Cl.
*G10L 21/00* (2006.01)

(52) U.S. Cl. .................. 704/273; 704/200; 704/210; 382/100

(58) Field of Classification Search .............. 704/273, 704/200, 210, 215, 500, 501; 382/100
See application file for complete search history.

(56) References Cited

U.S. PATENT DOCUMENTS

| 7,113,615 | B2 * | 9/2006 | Rhoads et al. | 382/100 |
|---|---|---|---|---|
| 2005/0033579 | A1 * | 2/2005 | Bocko et al. | 704/273 |

* cited by examiner

*Primary Examiner*—Huyen X. Vo
(74) *Attorney, Agent, or Firm*—Blank Rome LLP

(57) ABSTRACT

A method of embedding useful data in a digital music file in a way that maintains compatibility with existing digital music formats and players and has no effect on the size of the digital music file or sound quality. A digital music file is analyzed to determine a list of start and end locations of at least n consecutive zeros, defining a list of record locations, where n is an integer greater than two. The file store locations are written in initial record locations of the list of record locations and the data and a start key is written remaining record locations of the list of record locations. A process of retrieving the embedded data is also disclosed.

8 Claims, 3 Drawing Sheets

EMBEDDING AND EMPLOYING METADATA IN DIGITAL MUSIC USING FORMAT SPECIFIC METHODS

REFERENCE TO RELATED APPLICATION

The present invention claims the benefit of U.S. Provisional Patent Application No. 60/815,598, filed Jun. 22, 2006, whose subject matter is hereby incorporated by reference in its entirety into the present application.

FIELD OF THE INVENTION

The present invention relates to using metadata to provide extra information and/or context to existing files or providing such metadata upon creation. More particularly, the present invention relates the process of using metadata with digital music files to provide added value to the user.

DESCRIPTION OF RELATED ART

The addition of meta-data to digital music files presents many possibilities for delivering added value to the music user. Added content, ranging from album liner notes and images to lyrics, tablature and/or the score of a recording, could benefit the user in many ways, from providing information and entertainment value to enabling new methods to archive, search, compare, analyze, interact with and possibly even manipulate the music. The two requirements essential for the widespread adoption of a system for embedding metadata in music files are 1) the music file must remain compatible with the existing infrastructure of audio formats and hardware and software music play-back devices and 2) the system must not degrade the audio quality.

A number of audio watermarking technologies exist that enable significant amounts of data to be embedded in an audio file while satisfying the above two requirements. One type of system employs phase manipulation of the audio data. This system has high data capacity, up to tens of kilobytes per minute of recorded sound, it is inaudible and it is highly robust to compression and conversion between analog and digital formats. For example, the watermark may persist in a radio transmission of the music file. The second type of system, also inaudible, is designed around the format of audio files, such as the mp3 format, and embeds data in placeholder locations that are ignored by players. The data capacity depends on the type of music and the compression rate but is also at least tens of kb/minute. There is no change in the size of the file.

The motivation for developing much of the existing audio watermarking technology came from the area of digital rights management. Uses such as copy protection and file tracking have been proposed; however, it has proven difficult to identify workable models for such uses of watermarking. It would be beneficial to have a number of other possible uses of audio watermarking that would enhance the listeners' experience of the music and would allow for efficient storage of multiple forms of musical information.

There are many needs and opportunities in the area of digital music. It remains difficult to catalogue compressed music files. Since in compressed formats file length is restricted, the header information is extremely limited. Tags such as the ID3 format are prepended to the files and can hold significant quantities of data, but these add to the file size. Programs that allow a user to work with digital music files, such as iTunes™, impose their own proprietary formats on metadata. Users have an ever-growing problem of organizing their files.

The cataloging problem is compounded for libraries that require database type access to a collection of music files. Currently separate catalogues are required, with laborious data entry and coordination. It is impossible to search the files themselves and metadata information formats are often different.

Music comes in many forms: the recording itself, a MIDI representation, a notated score, the video of the performance or studio rehearsal, the lyric sheet, and the compositional process (chronology, sketches, etc.). All of these are desirable in various contexts yet are cumbersome to compile and coordinate. There is a need for a way to more closely couple these various representations of the music.

A digital music file is the end product of a process; it is self-contained and does not, by itself, lead the listener to related materials. These materials can be found in programs or on websites, but these are compiled from separate statistics and are lost when the music is removed from that context.

Searching is limited to text based tags, title, composer, performer, etc. There is a need for content based searching, motifs, themes, harmonies, rhythms, instrumentations, etc.

Interaction with digital music is limited to passive listening. It is apparent that there is the opportunity to add tremendous value for the user in the form of embedded information such as lyrics that would appear simultaneously with the playback, or even notation in various formats, chord progressions, guitar tablature, or traditional notation, to enable the user to sing or play along.

The problem of copyright protection and tracking of digital music files continues. Attempts to mark audio files for the purpose of controlling downloads have failed.

SUMMARY OF THE INVENTION

It is an object of the invention to overcome such difficulties.

Accordingly, the invention is directed to a method of embedding data in a digital music file. The method includes the steps of analyzing a digital music file to determine a list of start and end locations of at least n consecutive zeros, defining a list of record locations, where n is an integer greater than two, writing file store locations in initial record locations of the list of record locations, writing data and a start key remaining record locations of the list of record locations and outputting a revised digital music file with embedded data.

The analyzing step may include analyzing a non-header portion of the digital music file to define the list of record locations and the step of writing data and the start key may be performed in a reverse order of bytes in the list of record locations. Embodiments of the present invention also include a method of retrieving data from a digital music file, including the steps of analyzing a digital music file to determine a list of start and end locations of at least n consecutive zeros, defining a list of record locations, where n is an integer greater than two, extracting a key position from the digital music file based on the list of record locations, extracting data from the digital music file using the key position remaining record locations of the list of record locations and outputting the data.

These and other objects of the invention, as well as many of the intended advantages thereof, will become more readily apparent when reference is made to the following description, taken in conjunction with the accompanying drawings.

BRIEF DESCRIPTION OF THE DRAWINGS

Preferred embodiments of the present invention will be set forth in detail with reference to the drawings, in which.

DETAILED DESCRIPTION OF THE PREFERRED EMBODIMENTS

Figure 1:
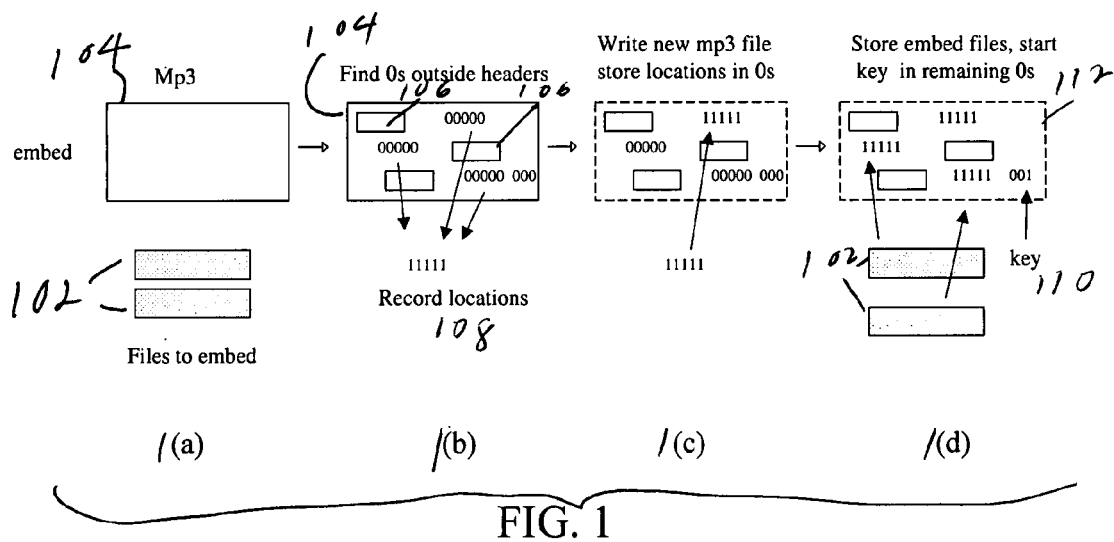
FIG. 1 is a flowchart which illustrates the process of embedding data in an mp3 file, in accordance with a preferred embodiment of the invention.

Preferred embodiments of the present invention will be set forth in detail with reference to the drawings, in which like reference numerals refer to like elements or steps throughout.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

Mp3 files include a number of frames, which include header/side information and audio data. The header/side information is given at the beginning of each frame and consists of two parts. First is the header in 4 bytes, giving the bitrate (kbps), the original sampling rate, the number of channels (stereo or mono), and other necessary information for the player. Second is the "side" information, 32 bytes specifying where the audio data is located and other information related to the process of reconstructing the sound. After the header/side information comes the audio data, which is Huffman encoded. The audio data fills out the remainder of each frame. At a recording rate of 192 kbps, the frames are 627 bytes each, with 36 reserved for the header/side information, that leaves 595 bytes for the audio information.

Within this audio information are bytes that have a 0 value. If a single 0 byte or two consecutive 0 bytes are changed, the sound of the file is damaged. If, however, there are 3 or more successive 0 bytes outside the headers, they can be changed to values 1-255 without affecting the sound. The embedded data is placed in these 0 positions. The 0s groups, and thus the space available, varies with the type of music and the bit rate of the mp3 file: music with more silence recorded at a higher bit rate allows for more embedding.

The embedded information is in two parts. The first part is the location of the information, given as the start and stop bytes for each group of 0s. If the number of 0s in each group is small, such as a group of 3, then a large amount of location information is required; if the groups of 0s are larger, the location information is correspondingly smaller. A balance should be struck between the number in the groups of 0s and the amount of location information, and the program tries several values from 3 to 10. The second part of the embedded information is the embedded data itself, given in consecutive bytes. The location information and the embedded data are recorded in the rewritten version of the original mp3 file.

Here is a sample bitstream for the embedded information:

2 bytes: number of bytes in the locations part of the embedded data;

1, 2 or 4 bytes: bytes in difference between the first end position—first start position;

1, 2 or 4 bytes: bytes in the second start position—the first end position;

1, 2 or 4 bytes: bytes in the second end position—the second start position;

. . .

1, 2 or 4 bytes: bytes in the nth end position—the nth start position;

1 bytes: number of embedded files;

embedded data;

4 bytes: last four positions of the last group of at least 8 consecutive 0s, for the "key" first starting position (bytes in reverse order to ensure non-0 value in first byte).

Figure 2:
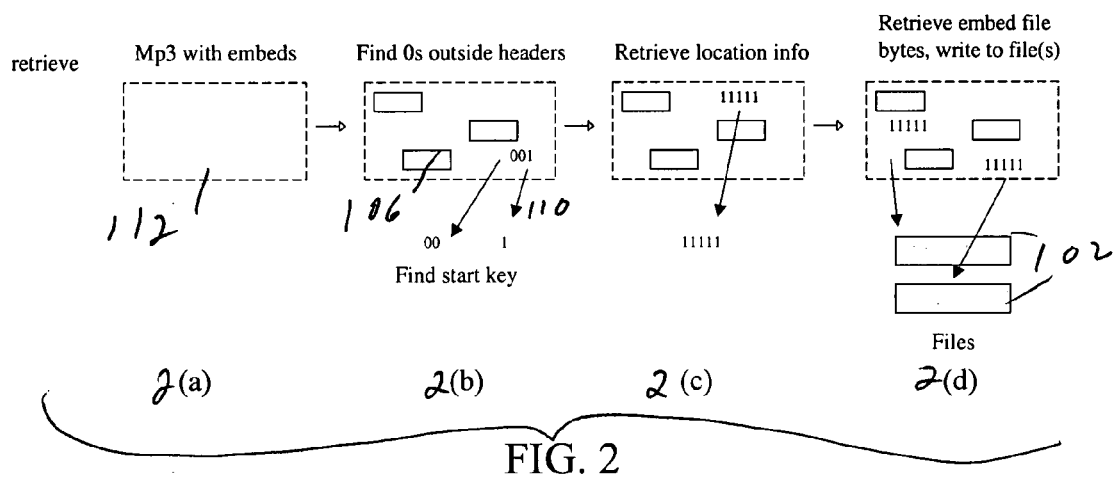
FIG. 2 is a flowchart which illustrates the process of retrieving data from an mp3 file, in accordance with an embodiment of the invention.

The process of embedding in and retrieving from data in an mp3 file is illustrated in FIGS. 1 and 2, and discussed below. The data to be embedded 102 and the music file 104 are illustrated in step 1(a). First, the mp3 file 104 is analyzed to find the headers 106 and determine the length of each frame, as shown in step 1(b). Then a list of start and end locations for groups 108 of at least n (starting at 3) consecutive 0s is made; only those groups that occur outside the frame headers are included. The first start/end group must be a least 2n+2 characters, to accommodate the initial 2 bytes length of the locations part of the embedded data, then at least one end and the next start position (for the retrieval of the embedded data, see below). The differences between consecutive start—end positions are recorded in 1 bytes for 1-255, 2 bytes if >255 and <65535 and 3 bytes if >65535. The 2 and 4 byte lengths are marked by preceding 0s.

Once the start/end positions are calculated, the last start/end combination must be at least n+4 bytes long, since the last 4 bytes will be used to store the initial starting position. The remaining at least n bytes need to be registered by the retrieval process. The start value is stored in reverse order of bytes (least to most significant) so there is a non-zero value in the first position. A list of start-end differences is made, recording the values in 1, 2 or 4 bytes as described above. The total number of bytes is recorded in the first 2 bytes, and the number and size of each data file to be embedded added.

A string is created from the list of start-end differences (the locations) and the embedded data sizes followed by the embedded data itself. See FIG. 1, step 1(c). A new mp3 file is then created with this string recorded in order winding through the start-end groups of 0s. The rest of the mp3 file is then written as a new file 112, including the key position 110, as shown in step 1(d).

To retrieve the embedded data, as illustrated in FIG. 2, the mp3 file with the data, step 2(a), is analyzed in the same way as the original. The headers and frame length are found. The consecutive groups of n 0s are recorded. The start key is extracted, as shown in FIG. 2, step 2(b). With this starting byte, the string of location bytes is gradually extracted, as shown in FIG. 2, step 2(c) and used to find more location bytes and eventually the embedded data. The retrieved files are written from the embedded data, as shown in FIG. 2, step 2(d).

Another aspect of the invention is directed to uses for encoded files. The encoding can be carried out as described above or in any other suitable manner. One such encoding scheme is disclosed in US 2005/0033579 A1, published Feb. 10, 2005, titled "Data hiding via phase manipulation of audio signals," whose disclosure is hereby incorporated by reference in its entirety into the present disclosure. An advantage of the encoding scheme disclosed in the '579 publication is that it survives playing over the radio.

A great number of systems may be imagined in which useful and desirable information is embedded within the sound file itself, so that however the audio data may be compressed, transmitted, or manipulated the embedded metadata accompanies the file and with the proper software/hardware, can be accessed. The embedded information could be textual, musical, and graphical, and even a limited amount of video could be included. Below we describe a range of possible types of metadata and imagined applications of the method.

One embodiment of the present invention involves cataloging and database information provided in the embedded data. This may take the form of standardized library and industry metadata formats, for example the information found in the card catalog entries in a music library such as performance and copyright dates, performers, composer, etc. This would enable large databases of the music itself to be searched directly rather than having separate repositories for the music and for the information about the music.

In another embodiment, the music may be represented in a number of alternative formats, including a MIDI file, the score in various notational systems, lead sheets (melody, chords and lyrics), tablature or other shorthand notations. These data could be extracted and made directly available to the user or the data could be used for cataloging and searching applications. Searching and comparing musical compositions, organizing and cataloging music all becomes practical in the context of notational formats because such formats bypass the very difficult audio file analysis that would be required if only the audio file were available.

This allows for queries such as: find pieces in which a trombone plays a specific high note, or find passages in which the viola and trumpets play together. Such queries can be answered by searching the MIDI or score data. The search result can also be returned by taking the listener directly to the section of the audio file containing the search result. Other examples include searching for a short theme or musical motif (a specific sequence of notes). Transposition (pitch shifting) also may easily be accommodated in notational representations, for example if one specified the motif in a specific key it would be straightforward to transpose it to all possible keys and search for its occurrence in any transposition.

Another embodiment enables Internet searching for specific pieces of music. There is a notable lack of the ability to search for specific pieces of music over the Internet, for example it should be possible to hum a few notes of a piece of music into one's computer and then search the Internet for that piece of music. A more limited version of this application could be incorporated in music download systems.

The embedded data can also be used interactively. The metadata could include photos of the artists, lyrics and liner notes, sketches, messages to fans, references to web sites and other further information, as well as alternate music representations. The alternate versions are also useful to users interested in study or replicating the music themselves. The user can view the vocal part with words to sing along, or the guitar part, etc. for a more integrated experience and study, or perhaps view a guitar lesson or hints for the best sound settings for each song and other applications. The user can print out the score or access a MIDI version for easy transposition, etc. Since the added information accompanies the song, the user has control over the whole product. By embedding their own information, listeners can personalize the musical experience, and perhaps share their experience with others.

Digital rights management is another embodiment of the present invention. The creation of workable copy protection or tracking schemes has eluded the music industry. It is clear that alternatives must be found that protect the artists' rights while providing value to the consumer. Possible alternatives could include shareware models for music distribution, in which information on how to make the voluntary shareware payment to the artist or institution is embedded in the music, perhaps as a link to a web-site where the payment could be made and additional music could be downloaded. This model has worked for many computer games and other software titles so it is possible that it could be applied successfully to music.

Another embodiment is directed to recorded voice transcripts. A further application of the method described here is applicable to voice recordings, such as archived news broadcasts, audio books, meeting recordings, and other recorded speech. In this application a text file representation of the recording could be embedded in the audio and serve as the basis for searching for specific content, or it could be presented to the user as sub-titles.

By embedding their own information, listeners can personalize the musical experience, and be motivated to share their experience with others. The embedded files could also be extracted so that they could be sent to another user and embedded in the other user's mp3 version of a song, so they could add more comments. This transfer of only the embedded file(s) would satisfy the RIAA, which might object to people trading mp3s files with embedded information.

Automated information embedding from databases: If a user had a folder containing mp3 files; s/he could log into a web site and, with permission granted, have data from a database embedded in the mp3 files for later viewing or other uses. The database could be part of an educational setting, an interest group, or a social network.

Data hiding: As users put music files on PDAs and cellphones, the ability to embed information in mp3 and other music files would provide a measure of security to the user. If the phone was stolen or lost, for instance, no valuable information could be extracted.

Figures 3A, 3B, 3C:
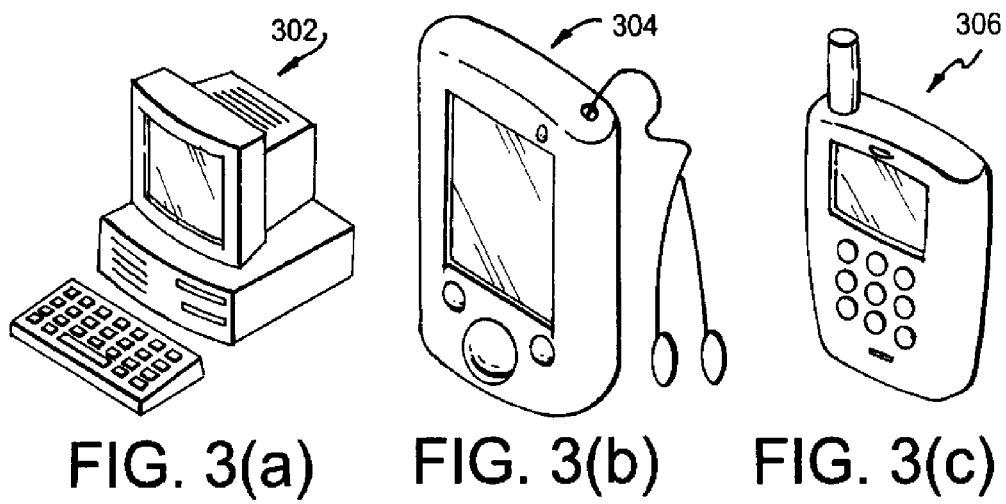
FIGS. 3(a)-(c) illustrate possible devices in which the present invention may be used, including a computer, FIG. 3(a); an mp3 player, FIG. 3(b); and a mobile phone, FIG. 3(c)

It should be noted that the present invention may be embodied on a computer readable medium and may be used in any device that accesses digital music files. Some specific embodiments of the present invention include systems that embed and retrieve data from digital music files in computers 302, FIG. 3(a), in mp3 players 304, FIG. 3(b), and mobile phones 306, FIG. 3(c). The present invention may also be embodied in networks that deliver music and/or music files to an end user or an intermediate reseller.

The embedding and retrieval programs can be written in any suitable programming languages, such as C++ and Java. The Java format better allows for eventual hardware interfaces, such as cellular telephones and PDA's.

The embedded information could be textual, musical, and graphical, even a limited amount of video could be included. A version of this is being tried in the marketplace on "Dual-Discs" that contain a CD on the one side and a DVD version containing additions (like the extras of a DVD movie) on the other. Of course, portable music devices will take only the music part of this added value information, defeating the purpose. If the added information accompanies the music file, however, it is always accessible. The information could include photos of the artists, lyrics and liner notes, sketches, messages to fans, references to web sites and other further information, as well as alternate music representations. The alternate versions might also be useful to users interested in study or replicating the music themselves. The user could view the vocal part with words to sing along, or the guitar part, etc. for a more integrated experience and study, or perhaps view a guitar lesson or hints for the best sound settings for each song and other applications. The user could print out the score or access a MIDI version for easy transposition, etc.

Since the added information accompanies the song, the user has control over the whole product.

Figure 4:
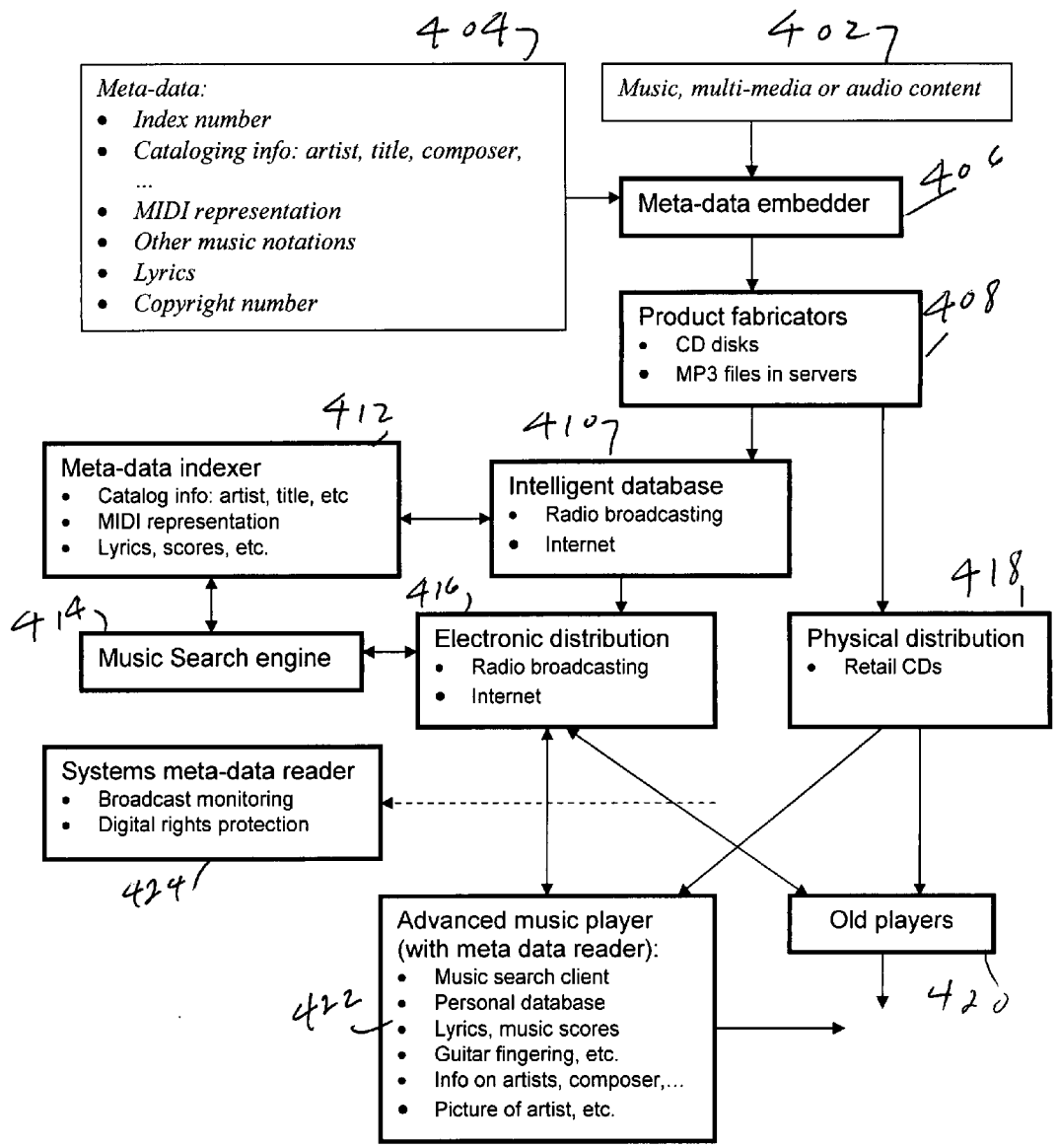
FIG. 4 is a flow chart of a manner in which the files with embedded data are used.

FIG. 4 shows a flow chart of such uses. Music, multimedia or other content 402 are provided, as are metadata 404, which can include such things as an index number, cataloging information (artist, title, composer), a MIDI representation of the music, other music notations, lyrics, and a copyright number. The metadata 404 are merged into the music 402 in a metadata embedder 406 in a manner such as those described above. The file with the embedded metadata is supplied to product fabricators 408 for distribution in forms such as CD's and MP3 files on servers. An intelligent database 410 makes the embedded files available for radio broadcasting, Internet distribution or the like. A metadata indexer 412 indexes the files in accordance with the embedded metadata for use by a music search engine 414. The files with the embedded metadata can be made available for electronic distribution 416. Alternatively, the embedded files can be made available for physical distribution 418 in the form of CD's or the like. The embedded files, whether physically or electronically distributed, can be played on old music players 420 or on advanced music players 422 capable of reading the metadata and displaying or otherwise providing the metadata to the user in usable form. In the case of electronic distribution, a systems metadata reader 424 can monitor broadcasting and possible violations of digital rights.

Figure 5:
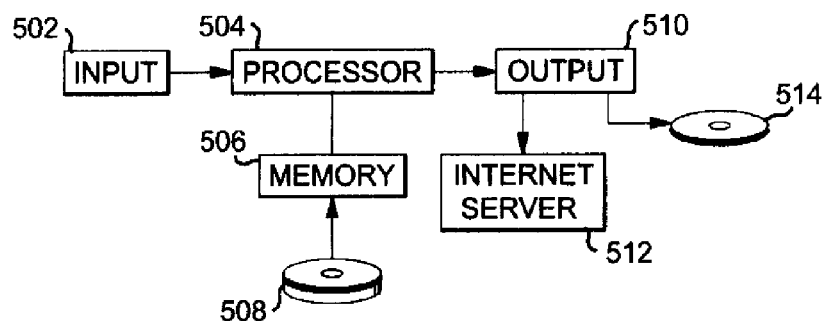
FIG. 5 is a block diagram of hardware for embedding the data.

The above embodiments can be implemented on hardware such as that shown in FIG. 5. An input 502 receives the audio files and the metadata. A processor 504 performs the operations described above. A memory 506 stores both working data and the software executed in the processor. That software can be supplied on any suitable medium 508. An output 510 receives the audio files with the embedded metadata and makes it available in any suitable manner, such as an Internet server 512 or a CD 514.

Having thus described several aspects of at least one embodiment of this invention, it is to be appreciated various alterations, modifications, and improvements will readily occur to those skilled in the art. While the present invention has discussed the embedding of data into mp3 files, the present invention is also applicable to other digital music formats, including AAC (Advanced audio coding) from MPEG-4, Windows Media Audio (WMA), Ogg Vorbis, ATRAC (Adaptive TRansform Acoustic Coding), Apple Lossless (ALAC), etc. Also, the present invention is not limited to music files, but can instead be extended to any files containing audio data.

Such alterations, modifications, and improvements are intended to be part of this disclosure, and are intended to be within the spirit and scope of the invention. Accordingly, the foregoing description and drawings are by way of example only.

The foregoing description and drawings should be considered as illustrative only of the principles of the invention. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A method of embedding data in a digital audio file, the method comprising:

(a) analyzing the digital audio file to determine a list of start and end locations of at least n consecutive zeros, defining a list of record locations, where n is an integer greater than two;
    (b) writing file store locations in initial record locations of the list of record locations;
    (c) writing data and a start key remaining ones of the record locations of the list of record locations; and
    (d) outputting a revised version of the digital audio file with the data embedded in the revised digital audio file.

2. The method of claim 1, wherein step (a) comprises analyzing a non-header portion of the digital audio file to define the list of record locations.

3. The method of claim 1, wherein step (c) is performed in a reverse order of bytes in the list of record locations.

4. A method of retrieving data from a digital audio file, the method comprising:

(a) analyzing the digital audio file to determine a list of start and end locations of at least n consecutive zeros, defining a list of record locations, where n is an integer greater than two;
    (b) extracting a key position from the digital audio file based on the list of record locations;
    (c) extracting data from the digital audio file using the key position remaining record locations of the list of record locations; and
    (d) outputting the data.

5. A device for embedding data in a digital audio file, the device comprising:

an input for receiving the data and the digital audio file;
    a processor, in communication with the input, for (a) analyzing the digital audio file to determine a list of start and end locations of at least n consecutive zeros, defining a list of record locations, where n is an integer greater than two; (b) writing file store locations in initial record locations of the list of record locations; and (c) writing data and a start key remaining ones of the record locations of the list of record locations; and
    an output, in communication with the processor, for outputting a revised version of the digital audio file with the data embedded in the revised digital audio file.

6. The device of claim 5, wherein the processor performs step (a) by analyzing a non-header portion of the digital audio file to define the list of record locations.

7. The device of claim 5, wherein the processor performs step (c) in a reverse order of bytes in the list of record locations.

8. A device for retrieving data from a digital audio file, the device comprising:

an input for receiving the digital audio file;
    a processor, in communication with the input, for (a) analyzing the digital audio file to determine a list of start and end locations of at least n consecutive zeros, defining a list of record locations, where n is an integer greater than two; (b) extracting a key position from the digital audio file based on the list of record locations; and (c) extracting data from the digital audio file using the key position remaining record locations of the list of record locations; and
    an output, in communication with the processor, for outputting the data.

* * * * *